Oct. 23, 1951  H. H. KUGEL  2,572,735
FILM HOLDER
Filed Feb. 8, 1946

Inventor
Harry H Kugel
Ralph Hammar
By
Attorney

Patented Oct. 23, 1951

2,572,735

UNITED STATES PATENT OFFICE 2,572,735

FILM HOLDER

Harry H. Kugel, Erie, Pa., assignor to National Organ Supply Company, Erie, Pa., a corporation of Pennsylvania Application February 8, 1946, Serial No. 646,333

5 Claims. (Cl. 40—159)

This invention is intended to provide a holder for mounting film for storage, projection or viewing in which the film is carried in a drawer-like recess in one face of a slide and is held flat in the recess by an overlying wall of a frame. In a preferred form the slide is opaque with a window corresponding to the exposed portion of the film and the front and back walls of the frame are transparent. By locating the film in the recess and then sliding the slide into the frame, the film is both mounted and masked and ready for projection or viewing. Further objects and advantages appear in the specification and claims.

Figures 1, 3:
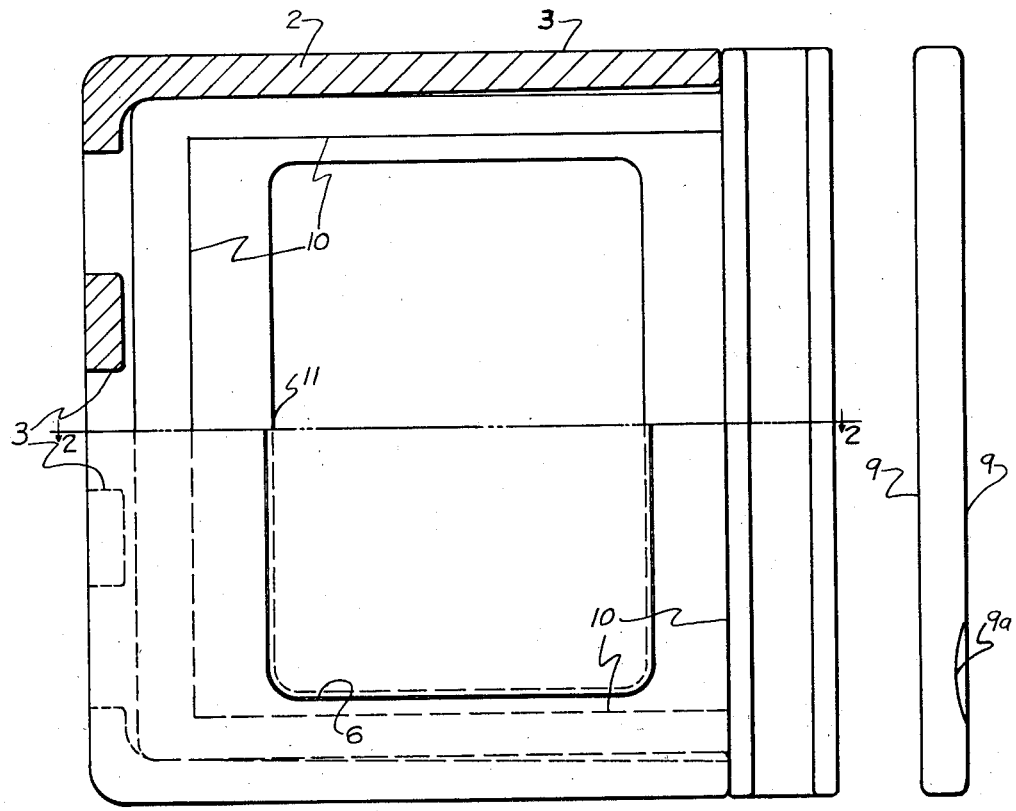
Figure 2:
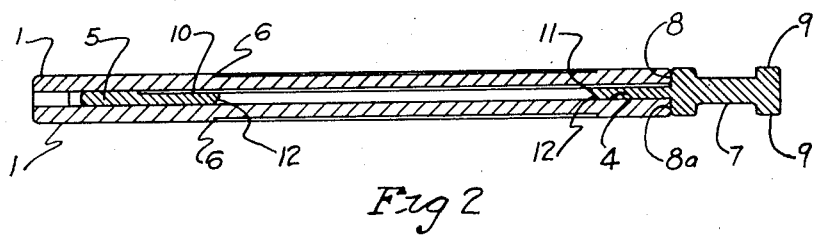

In the drawing, Fig. 1 is a plan view partly broken away of the holder; Fig. 2 is a section on line 2—2 of Fig. 1; and Fig. 3 is an end view.

Referring to the drawing, 1 indicates front and back walls of a frame spaced apart by marginal connecting walls 2 at the sides and by spaced connecting walls 3 at one end. At the other end is a slot 4 through which is inserted a slide 5 of thickness substantially equal to the spacing between the walls 1.

The frame is adapted to molding from plastic and in accordance with the practice of the art may be molded in one piece or in separate pieces cemented together. When molding in one piece there is a slight draft toward the slot 4 to permit withdrawal of the core. In the cemented construction, front and back walls are molded separately and cemented at the connecting walls 2 and 3.

The frame may be made of one of the transparent plastics having the necessary optical properties. To protect the light transmitting or window portion of the walls 1 from scratches, both walls are provided with recesses 6 corresponding to the exposed portion of the film. The frame is symmetrical so either wall may be the front wall.

At one end of the slide is an I-shaped handle 7 of the same overall thickness as the frame. The front or inner edges 8, 8a of the handle serve as a stop locating the slide in the frame. In one of the outer edges 9 of the handle and toward one end is a finger recess 9a which assists in removal of the holder from a file and by its location identifies the top and front of the holder.

The slide may be made of an opaque plastic. In one face of the slide is a drawer-like recess 10 of depth corresponding to the thickness of the film and of width and length corresponding to the size of the film. One end of the recess is at the edge 8 of the handle 7. The sides and other end of the recess are spaced inward from the margin of the slide. At the center of the slide is a window 11 corresponding to the exposed portion of the film. The edges of the window are spaced inward from the edge of the recess 10 so the marginal or unexposed portion of the film is held flat in the recess by engagement with the inner surface of the adjacent wall of the frame. The portion of the slide around the window 11 being opaque serves as a mask. The edge of the window is bevelled at 12 away from the film.

In the use of the holder, the slide 5 is withdrawn from the frame until the recess 10 is exposed sufficiently to readily receive a film. The outermost part of the film then rests against the relatively high edge 8 of the handle so that as the slide is inserted in the frame there is substantially no chance of the film slipping out of the recess. The film is held flat with no danger of buckling. Because the marginal edges of the film are accurately located by the recess, the exposed portion of the film registers with the window 11 and is properly matched. From one aspect the recess 10 is a drawer in which the film is dropped and the mounting operation is similar to opening and closing a drawer. It is obviously easy to remove a film from the holder and replace it with another. The film holders being of uniform thickness are readily filed. The film is completely enclosed and protected.

What I claim as new is:

1. In a film mount, a holder having in one face a recess of depth substantially equal to the thickness of a film receiving the unexposed film edges, a shoulder at one end of the recess projecting above the face of the holder for locating one end of the film, a cooperating plate overlying the recess and having a face engaging the unexposed edges of the film and holding the film in the recess and having an end engaging said shoulder said slide and walls having window portions through which the exposed portion of the film is visible, and means holding the holder and plate together.

2. In a film mount, a holder having in one face a recess of depth substantially equal to the thickness of a film receiving the unexposed film edges, a shoulder at one end of the recess projecting above the face of the holder for locating one end of the film, a cooperating plate overlying the recess and having a face engaging the unexposed edges of the film and holding the film in the recess, the holder having surfaces around the sides and around the end of the recess opposite the shoulder which slidably engage the plate said slide and walls having window portions through which the exposed portion of the film is visible, and means holding the holder and plate together.

3. In a film mount, a drawer-like slide having in one face a recess of depth substantially equal to the thickness of a film for receiving the unexposed film edges, a frame having front and back walls spaced apart to define a slot receiving the slide, one of the walls overlying the unexposed edges of the film and holding the film in said recess, and a window in the slide and window portions in said walls through which the exposed portion of the film are visible.

4. In a film mount, a drawer-like slide having in one face a recess of depth substantially equal to the thickness of a film for receiving the unexposed film edges, a frame having front and back walls spaced apart to define a slot receiving the slide, one of the walls overlying the unexposed edges of the film and holding the film in said recess, said slide and walls having window portions through which the exposed portion of the film is visible, and a handle for the slide having a shoulder abutting the edge of said one wall to locate the inner position of the slide, the shoulder forming one edge of the recess.

5. In a film mount, a drawer-like slide of opaque material having in one face a recess of depth substantially equal to the thickness of a film for receiving the unexposed margin of the film, a window in the bottom of the drawer registering with the exposed portion of the film, a frame having a slot receiving the slide, a wall on the frame overlying the margin of the film and holding the film in the recess, and a window in the frame registering with and through which the exposed portion of the film is visible.

HARRY H. KUGEL.

REFERENCES CITED

The following references are of record in the file of this patent:

UNITED STATES PATENTS

| Number | Name | Date |
| --- | --- | --- |
| 951,418 | Dutton | Mar. 8, 1910 |
| 1,012,945 | Warner | Dec. 26, 1911 |
| 1,400,958 | Kelly | Dec. 20, 1921 |
| 1,407,906 | Wenderhold | Feb. 28, 1922 |
| 1,467,108 | Hodgson | Sept. 4, 1923 |
| 1,498,895 | Theriault | June 24, 1924 |
| 1,568,674 | Knowles | Jan. 5, 1926 |
| 1,958,618 | Gilmore | May 15, 1934 |
| 2,196,918 | Hepworth et al. | Apr. 9, 1940 |
| 2,371,666 | Zwirn | Mar. 20, 1945 |
| 2,535,265 | Caffrey | Dec. 26, 1950 |

FOREIGN PATENTS

| Number | Country | Date |
| --- | --- | --- |
| 503,937 | Great Britain | Apr. 11, 1939 |
| 703,921 | Germany | Mar. 20, 1941 |